United States Patent
Brandt et al.

(10) Patent No.: US 6,863,144 B2
(45) Date of Patent: Mar. 8, 2005

(54) SELECTABLE CONTROL PARAMETERS ON POWER MACHINE

(75) Inventors: Kenneth A. Brandt, Eagan, ND (US); Scott R. Rossow, Kindred, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 131 days.

(21) Appl. No.: 09/733,622

(22) Filed: Dec. 8, 2000

(65) Prior Publication Data

US 2002/0074179 A1 Jun. 20, 2002

Related U.S. Application Data

(63) Continuation-in-part of application No. 09/733,647, filed on Dec. 8, 2000, now Pat. No. 6,550,562.

(51) Int. Cl.$^7$ .............................. B60K 26/00
(52) U.S. Cl. .................. 180/333; 74/471 XY
(58) Field of Search ................ 180/333, 315; 74/471 XY

(56) References Cited

U.S. PATENT DOCUMENTS

| | | |
|---|---|---|
| 849,483 A | 4/1907 | Magie |
| 2,748,509 A | 6/1956 | Brown |
| 2,804,158 A | 8/1957 | Yunker |
| 2,906,358 A | 9/1959 | Tucker, Sr. |
| 2,922,482 A | 1/1960 | Fisher |
| 3,161,172 A | 12/1964 | Kassbohrer |
| 3,180,305 A | 4/1965 | Gower-Rempel |
| 3,596,730 A | 8/1971 | Cecce ........................ 180/79.2 |
| 3,620,321 A | 11/1971 | Thilobodeau ................. 180/46 |
| 3,666,034 A | 5/1972 | Stuller et al. ............... 180/6.48 |
| 3,977,693 A | 8/1976 | Gamaunt ...................... 280/91 |
| 3,983,950 A | 10/1976 | Fabian ......................... 180/24 |
| 4,074,784 A | 2/1978 | Lee et al. ..................... 180/24 |
| 4,090,581 A | 5/1978 | Miner et al. ................ 180/140 |
| 4,162,708 A | 7/1979 | Johnson ...................... 172/4.5 |
| 4,205,730 A | 6/1980 | McColl ....................... 180/261 |
| 4,237,994 A * | 12/1980 | McColl ....................... 180/179 |
| 4,407,381 A | 10/1983 | Oswald et al. ............. 180/6.48 |
| 4,446,941 A | 5/1984 | Laurich-Trost .............. 180/236 |
| 4,498,554 A | 2/1985 | Young et al. ............... 180/236 |
| 4,549,610 A | 10/1985 | van der Lely ................. 172/3 |
| 4,782,906 A | 11/1988 | Kole ............................ 180/23 |
| 4,949,805 A * | 8/1990 | Mather et al. .............. 180/324 |
| 5,042,314 A * | 8/1991 | Rytter et al. ................ 180/333 |
| 5,154,437 A | 10/1992 | Inagaki et al. ................ 280/91 |
| 5,174,115 A * | 12/1992 | Jacobson et al. ........... 180/324 |
| 5,261,291 A * | 11/1993 | Schoch et al. .............. 180/333 |
| 5,263,432 A * | 11/1993 | Davis ......................... 114/286 |
| 5,566,586 A * | 10/1996 | Lauer et al. ................. 180/333 |
| 5,618,156 A | 4/1997 | Brown ........................ 414/694 |
| 5,752,578 A * | 5/1998 | Kellogg ....................... 180/414 |
| 5,764,219 A * | 6/1998 | Rutledge et al. ............ 345/159 |
| 5,828,971 A | 10/1998 | Dickhans et al. ............. 701/41 |
| 5,886,418 A * | 3/1999 | Kondo et al. ................ 307/9.1 |
| 5,931,881 A * | 8/1999 | Gustin et al. ............... 180/197 |
| 6,039,133 A * | 3/2000 | Zulu .......................... 180/403 |
| 6,052,633 A * | 4/2000 | Fukuyama et al. ......... 180/400 |
| 6,266,596 B1 * | 7/2001 | Hartman et al. ............ 180/419 |
| 6,446,747 B1 * | 9/2002 | Muller et al. ............... 180/333 |

FOREIGN PATENT DOCUMENTS

| | | |
|---|---|---|
| EP | 0 905 326 A1 | 2/1998 |
| GB | 770667 | 5/1954 |
| GB | 1 427 410 | 7/1973 |
| GB | 2 029 784 A | 8/1979 |
| JP | 02230410 | 9/1990 |
| WO | WO 90/06252 | 6/1990 |
| WO | WO 00/37744 | 6/2000 |

* cited by examiner

Primary Examiner—Paul N. Dickson
Assistant Examiner—Joselynn Y. Sliteris
(74) Attorney, Agent, or Firm—Westman, Champlin & Kelly, P.A.

(57) ABSTRACT

A control system in accordance with one feature of the present invention includes one or more user inputs, movable by a user in an operator compartment of a power machine. The user inputs can be used to set values for a plurality of settable operating parameters to direction of movement of the power machine, as well as travel speed.

33 Claims, 13 Drawing Sheets

SELECTABLE CONTROL PARAMETERS ON POWER MACHINE

REFERENCE TO CO-PENDING APPLICATION

The present application is a continuation-in-part U.S. patent application Ser. No. 09/733,647, filed Dec. 8, 2000, now U.S. Pat. No. 6,550,562 the content of which is hereby incorporated by reference in its entirety.

BACKGROUND OF THE INVENTION

The present invention generally relates to user input devices for power machines. In particular, the present invention relates to a control system on a power machine with a plurality of selectable parameters.

Power machines, such as loaders, typically have a number of power actuators. Such actuators can include, for example, drive actuators which provide traction power to the wheels or tracks of the machine. The actuators can also include those associated with manipulating a primary working tool, such as a bucket. In that case, the actuators include lift and tilt actuators. Of course, a wide variety of other actuators can also be used on such power machines. Examples of such actuators include auxiliary actuators, hand-held or remote tool actuators or other actuators associated with the operation of the power machine itself, or a tool coupled to the power machine.

The various actuators on such power machines have conventionally been controlled by mechanical linkages. For example, when the actuators are hydraulic actuators controlled by hydraulic fluid under pressure, they have been controlled by user input devices such as handles, levers, or foot pedals. The user input devices have been connected to a valve spool (of a valve which controls the flow of hydraulic fluid under pressure to the hydraulic actuator) by a mechanical linkage. The mechanical linkage transfers the user input motion into linear displacement of the valve spool to thereby control flow of hydraulic fluid to the actuator.

Electronic control inputs have also been developed. The electronic inputs include an electronic sensor which senses the position of user actualable input devices (such as hand grips and foot pedals). In the past, such sensors have been resistive-type sensors, such as rotary or linear potentiometers.

In the past, power machines having electronic controls have controlled both speed and steering based on a preset and predetermined control algorithm. Changing the operating parameters was cumbersome often requiring complex reprogramming of the controller.

SUMMARY OF THE INVENTION

A control system in accordance with one feature of the present invention includes one or more user inputs, movable by a user in an operator compartment of a power machine. The user inputs can be used to set values for a plurality of settable operating parameters to control direction of movement of the power machine, as well as travel speed.

DETAILED DESCRIPTION OF THE ILLUSTRATIVE EMBODIMENTS

Figure 1:
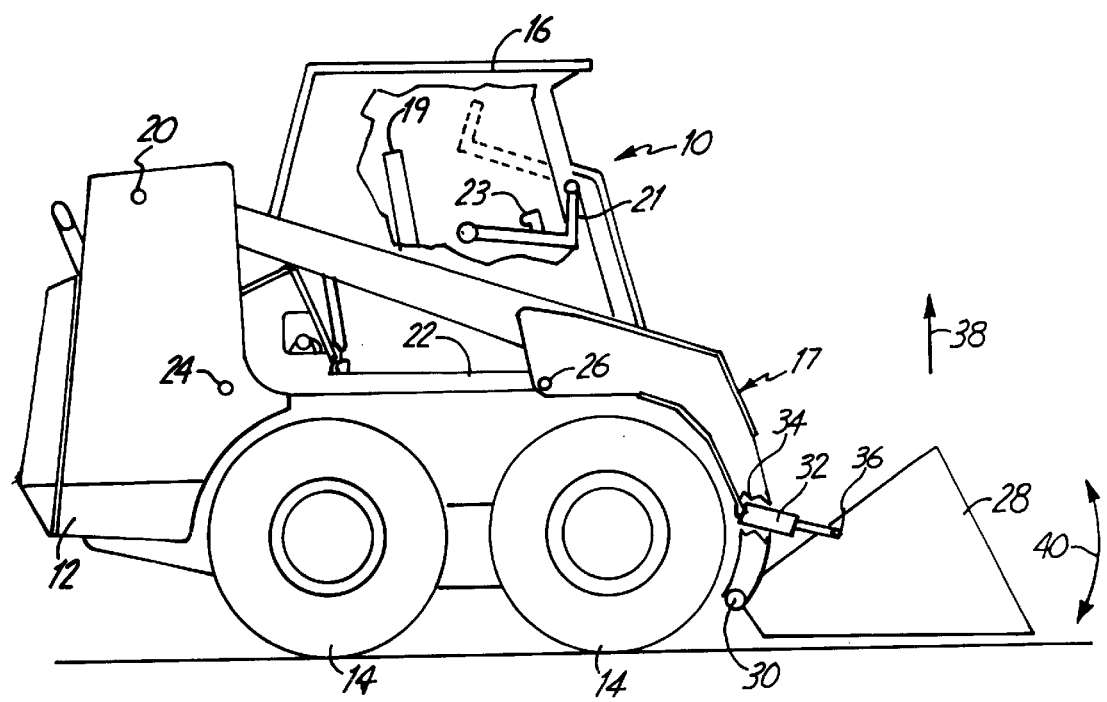
FIG. 1 is a side elevational view of a power machine in accordance with one embodiment of the present invention.

FIG. 1 is a side elevational view of one embodiment of a loader 10 according to the present invention. Loader 10 includes a frame 12 supported by wheels 14. Frame 12 also supports a cab 16 which defines an operator compartment and which substantially encloses a seat 19 on which an operator sits to control skid steer loader 10. A seat bar 21 is optionally pivotally coupled to a front portion of cab 16. When the operator occupies seat 19, the operator then pivots seat bar 21 from the raised position (shown in phantom in FIG. 1) to the lowered position shown in FIG. 1.

A pair of steering joysticks 23 (only one of which is shown in FIG. 1) are mounted within cab 16. Joysticks 23 are manipulated by the operator to control forward and rearward movement of loader 10, and in order to steer loader 10. One embodiment of joystick 23 which is illustrated in greater detail with respect to FIGS. 14A–14B.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is coupled to a working tool which, in this embodiment, is a bucket 28. In a simplified embodiment, lift arm 17 is pivotally coupled to bucket 28 at pivot points 30, and another hydraulic cylinder 32 is pivotally coupled to lift arm 17 at pivot point 34 and to bucket 28 at pivot point 36. However, any suitable type of connection can be used. Also, while only one cylinder 32 is shown, it is to be understood that any desired number of cylinders can be used to work bucket 28 or any other suitable tool.

The operator residing in cab 16 manipulates lift arm 17 and bucket 28 by selectively actuating hydraulic cylinders 22 and 32. In prior loaders, such actuation was accomplished by manipulation of foot pedals in cab 16 or by actuation of hand grips in cab 16, both of which were attached by mechanical linkages to valves (or valve spools) which control operation of cylinders 22 and 32. However, in accordance with the present invention, this actuation is accomplished by moving a movable element, such as a joystick, foot pedal or user actuable switch or button on a hand grip on joystick 23 and electronically controlling movement of cylinders 22 and 32 based on the movement of the movable element. In one embodiment, movement of the movable elements is sensed by a controller in the hand grip and is communicated to a main control computer used to control the cylinders and other hydraulic or electronic functions on a loader 10. In another embodiment, certain functions are not sensed by the controller in the hand grip but are communicated directly to the main control computer.

By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length, bucket 28 moves generally vertically downward to the position shown in FIG. 1.

The operator can also manipulate bucket 28 by actuating cylinder 32. This is also illustratively done by pivoting or actuating a movable element (such as a foot pedal or a hand grip on a joystick or a button or switch on a handgrip) and electronically controlling cylinder 32 based on the movement of the element. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

While this description sets out many primary functions of loader 10, a number of others should be mentioned as well. For instance, loader 10 may illustratively include blinkers or turn signals mounted to the outside of the frame 12. Also loader 10 may include a horn and additional hydraulic couplers, such as front and rear auxiliaries, which may be controlled in an on/off or proportional fashion. Loader 10 may also be coupled to other tools which function in different ways than bucket 28. Therefore, in addition to the hydraulic actuators described above, loader 10 may illustratively include many other hydraulic or electronic actuators as well.

In one illustrative embodiment, loader 10 is an all-wheel steer loader. Each of the wheels is both rotatable and pivotable on the axle on which it is supported. Pivoting movement can be driven using a wide variety of mechanisms, such as a hydraulic cylinder, an electric motor, etc. For the sake of clarity, the present description will proceed with respect to the wheels being individually steered with hydraulic cylinders.

In addition, loader 10 illustratively includes at least two drive motors, one for the pair of wheels on the left side of the vehicle and one for the pair of wheels on the right side of the vehicle. Of course, loader 10 could also include a single drive motor for all four wheels, or a drive motor associated with each wheel.

Figure 2:
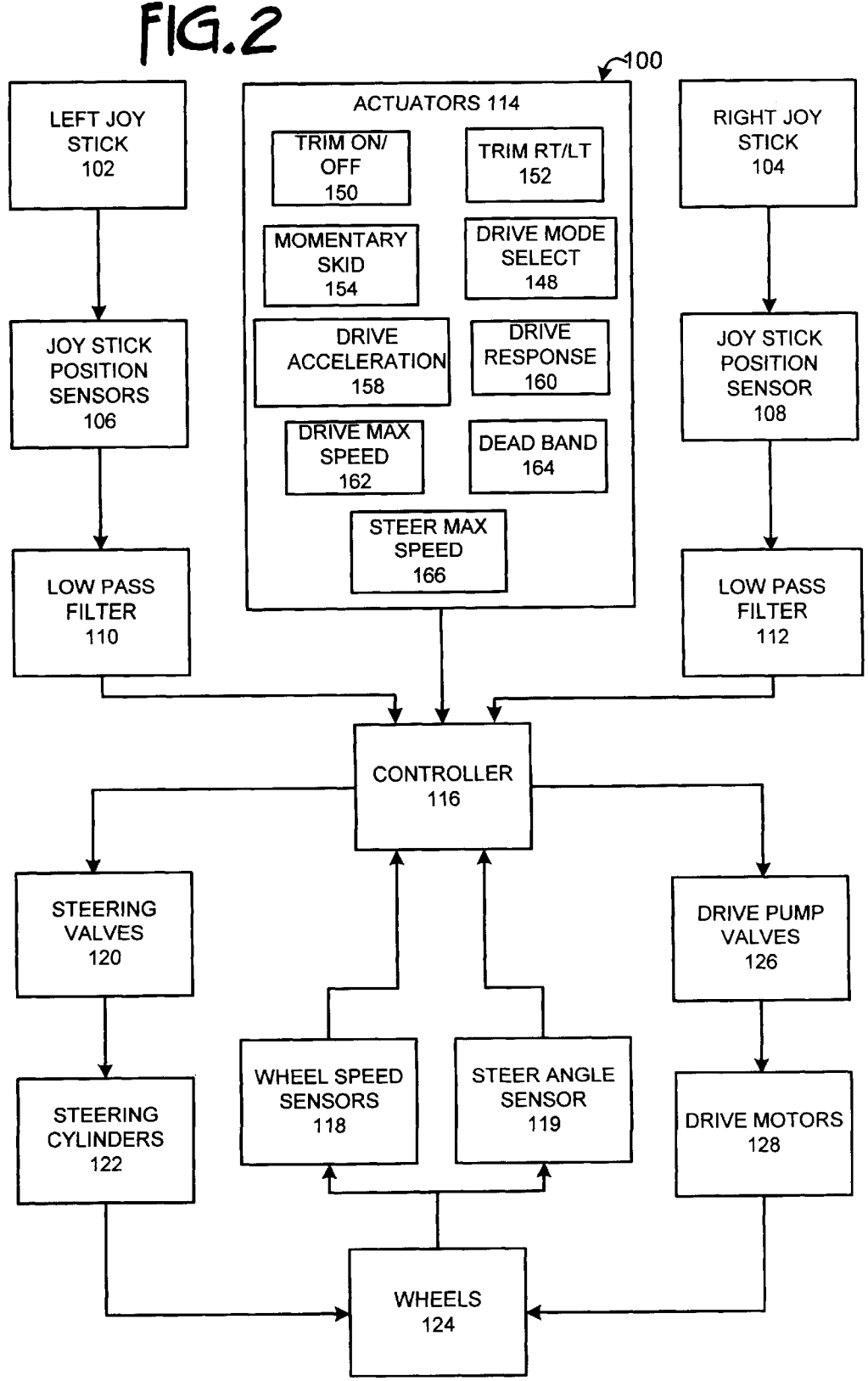
FIG. 2 is a block diagram of a control circuit in accordance with one embodiment of the present invention.

FIG. 2 is a block diagram of a control system 100 in accordance with one illustrative embodiment of the present invention. System 100 includes left joystick 102, right joystick 104 (collectively joysticks 23), joystick position sensors 106 and 108, low pass filters 110 and 112, actuator inputs 114, controller 116, wheel speed sensors 118 and steer angle sensor 119. FIG. 2 also illustrates steering valves 120, steering cylinders 122, wheels 124, drive pump valves 126 and drive motors 128.

In one embodiment, left and right joystick 102 and 104 illustratively include hand grips which are described in greater detail in co-pending U.S. patent application Ser. No 09/733,647 entitled HAND GRIP WITH MICROPROCESSOR FOR CONTROLLING A POWER MACHINE, filed Dec. 8, 2000. The handgrips are also discussed briefly with respect to FIGS. 14A and 14B. In that embodiment, the handgrips include controllers or microprocessors which sense joystick movement and provide a position signal output indicative of displacement of the joysticks from neutral. Of course, any other suitable configurations can be used as well.

Joystick position sensors 106 and 108 are illustratively commercially available joystick position sensors which can be controller-implemented and which are coupled to joysticks 102 and 104, respectfully. Joystick sensors 106 and 108 can illustratively sense the X and Y position of joysticks 102 and 104, relative to their central, neutral position. Joystick position sensors 106 and 108 illustratively convert the physical or mechanical movement of joysticks 102 and 104 into an electrical output signal which is provided, through low pass filters 110 and 112, to controller 116.

In one illustrative embodiment, low pass filters 110 and 112 filter out high frequency jitter provided by joystick position sensors 106 and 108. This has the effect of filtering out very rapid movements of joysticks 102 and 104 from the steering and speed functions. In one illustrative embodiment, filters 110 and 112 are configured to filter out changes in joystick position which are above approximately 2.5–3 Hz. This reduces undesirable steering characteristics based on erroneous operator inputs due to vehicle bouncing, or due to other movements which cause unwanted relative movement of the machine and operator.

In one illustrative embodiment, filters 110 and 112 are discrete filters implemented in hardware using one of any number of conventional filtering techniques. Of course, low pass filters 110 and 112 can be implemented in the software associated with controller 116 or the controller in the handgrips of joysticks 102 and 104, as well. In any case, controller 116 is configured to provide output control signals based on input signals from the joysticks which have maintained a steady state for a predetermined amount of time.

Controller 116 in one illustrative embodiment, is a digital computer, microcontroller, or other type of control component with associated memory and time circuitry.

Wheel sensors 118 illustratively include magnetic sensors, Hall effect sensors, or other similar sensors which can sense the speed of rotation of wheels 124. In one illustrative embodiment, there is only a single wheel speed sensor 118 for the left pair of wheels and a single sensor 118 for the right pair of wheels. That sensor, of course, is mounted to only one of the left or right wheels, respectively. However, in another illustrative embodiment, there is a wheel speed sensor 118 configured to sense the rotational speed of each of the wheels 124.

In any case, wheel sensors 118 illustratively provide a pulsed output wherein the frequency of the pulses vary based on wheel speed. In one illustrative embodiment, the wheel speed sensors provided approximately 60 pulses per wheel rotation. Of course, wheel speed sensors 118 can also be mounted adjacent drive motors 128 which drive the wheels. In that case, wheel speed sensors 118 simply senses the speed of rotation of the motor, in any one of a wide variety of conventional fashions.

Control system 100 also illustratively includes steering angle sensors 119. Sensors 119 can be angle encoders located on the pivotable axes of wheels 124, potentiometers, magnetic sensors, or any other type of sensor which provides a signal indicative of the steering angle of each wheel relative to a predetermined position (such as straight ahead).

Actuator inputs 114 are illustratively push buttons, triggers, rocker switches, paddle or slide switches or other thumb or finger actuable inputs which can be located on joysticks 102 and 104 or on the control panel or on other desirable location accessible by the user. Such buttons illustratively include a mode switch 148 for selecting one of a plurality of different steering modes.

For example, given that each of the wheels is independently steerable, loader 10 can be controlled in one of several modes illustrated by FIGS. 3A–3E. Loader 10 can be controlled in a normal skid steer mode (illustrated in FIG. 3A), in which all wheels are pointed straight ahead and left and right pairs of wheels are controlled to accomplish skid steering. In that configuration, steering can be accomplished using a single joystick, or the left joystick can control forward and reverse rotation and speed of the wheels on the left side of loader 10 while the right joystick can control forward and reverse rotation and speed of the wheels on the right side of the loader.

Figure 3A:
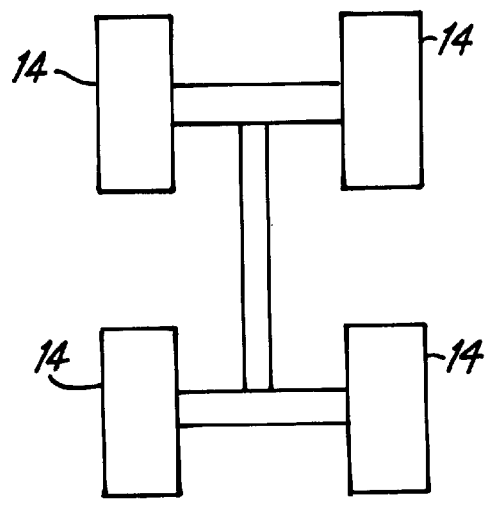
FIGS. 3A–3E illustrate different steering modes.
Figure 3B:
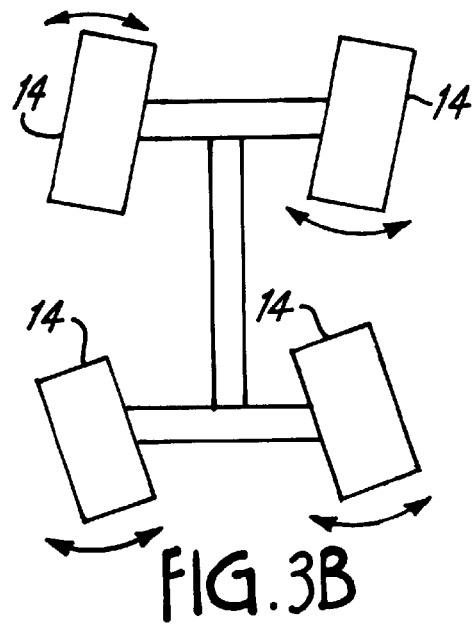

The loader can also illustratively be controlled in coordinated steer mode, illustrated in FIG. 3B. In this mode, the front wheels work together as a pair, and the rear wheels work together as a pair. For example, in order to accomplish a right hand turn, the front wheels turn toward the right while the rear wheels turn to the left causing the loader to turn more sharply.

Figure 3C:
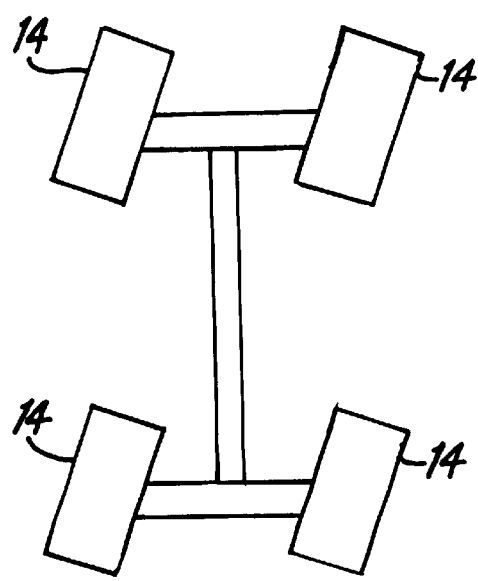

The loader can also be controlled in a crab steer mode, as illustrated in FIG. 3C. In that mode, again the front wheels act as a single pair of wheels and the rear wheels also act as a single pair. However, in order to accomplish a forward right hand turn, for instance, both the front and rear pairs of wheels turn toward the right. This causes loader 10 to move both forward and to the right in a diagonal direction relative to its longitudinal axis. Similarly, in order to accomplish a forward left-hand turn, both the front and rear pairs of wheels are turned toward the left. Again causing the loader to move in a generally diagonal direction, relative to its longitudinal axis.

Figure 3D:
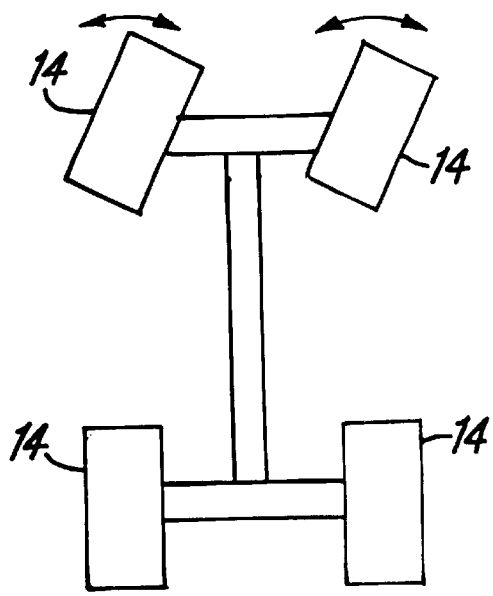
Figure 3E:
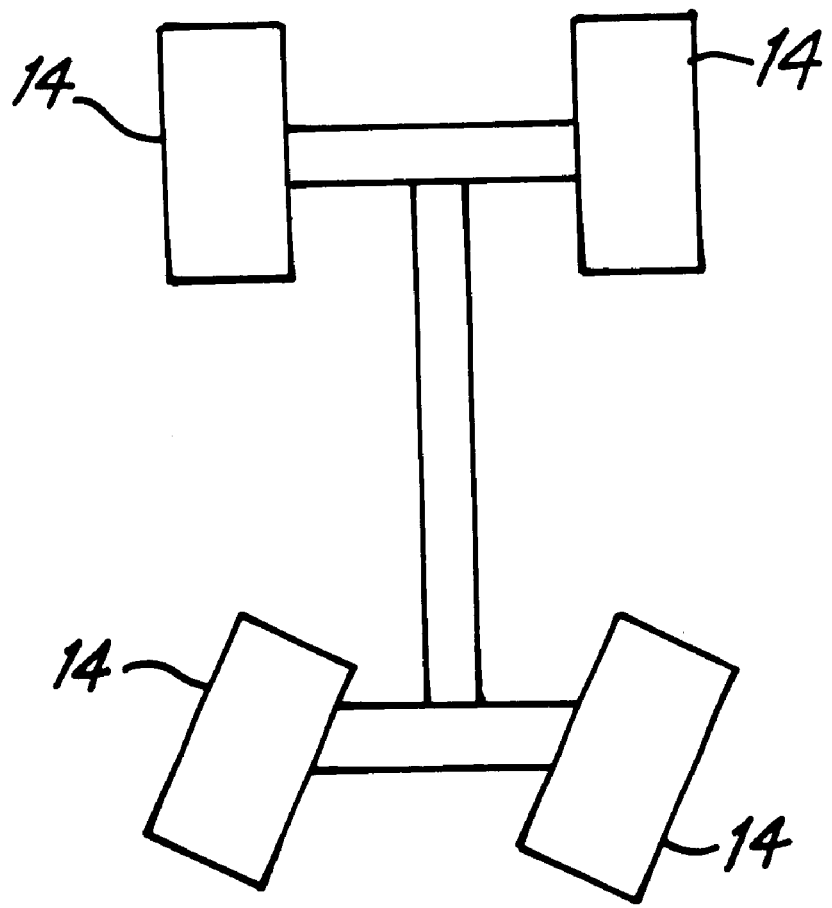

Of course, the loader can also be controlled (as illustrated in FIGS. 3D and 3E) using a front wheel steer mode (FIG. 3D) in which the front wheels steer in a customary fashion, or a rear wheel steer mode (FIG. 3E) in which the rear wheels steer the vehicle. The vehicle is illustratively steered using only a single joystick. If the joystick is moved forward and right or left, the machine moves forward and right or left. Similarly, if the joystick is moved rearward and right or left, the machine moves rearward and right or left.

Figure 4:
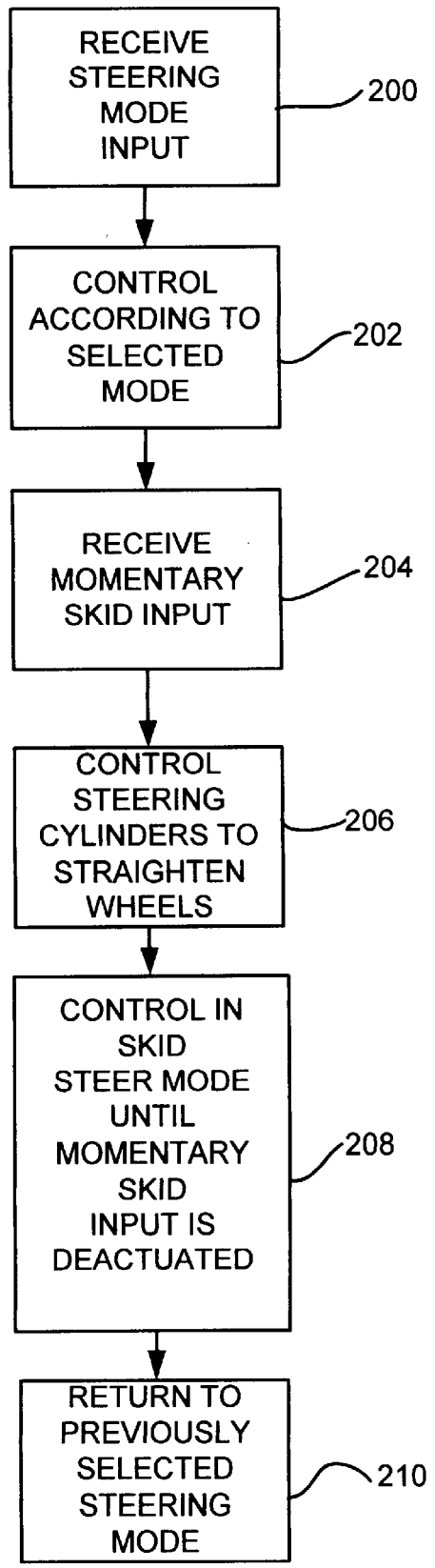
FIG. 4 is a flow diagram illustrating a momentary skid steer mode.

The buttons (or actuators 114) also illustratively include a momentary skid steer switch 154. Control is illustrated with respect to FIGS. 2 and 4. In that embodiment, a steering mode is first selected, as indicated by block 200 in FIG. 4. Controller 116 controls steering according to that mode as indicated by block 202. When the momentary skid steer switch 154 is depressed (as indicated by block 204), controller 116 senses the steering angle of all wheels based on the feedback from sensor 119 and provides signals to valves 120 so the wheels 124 of the loader will quickly become aligned in a straight forward configuration, as indicated by block 206. Both joysticks 102 and 104 provide signals to controller 116 which controls the loader based on those signals for steering the loader in a conventional skid steer mode as indicated by block 208. However, when the momentary skid steer switch 154 is released, or deactuated, then controller 116 reverts to controlling the loader according to the steering mode which it was in prior to depression of the momentary skid steer switch 154, or to another predetermined steering mode, as indicated by block 210. Of course, while the present discussion has proceeded with respect to a momentary skid steer mode, a momentary switch can be assigned to other steering modes as well.

Figure 5:
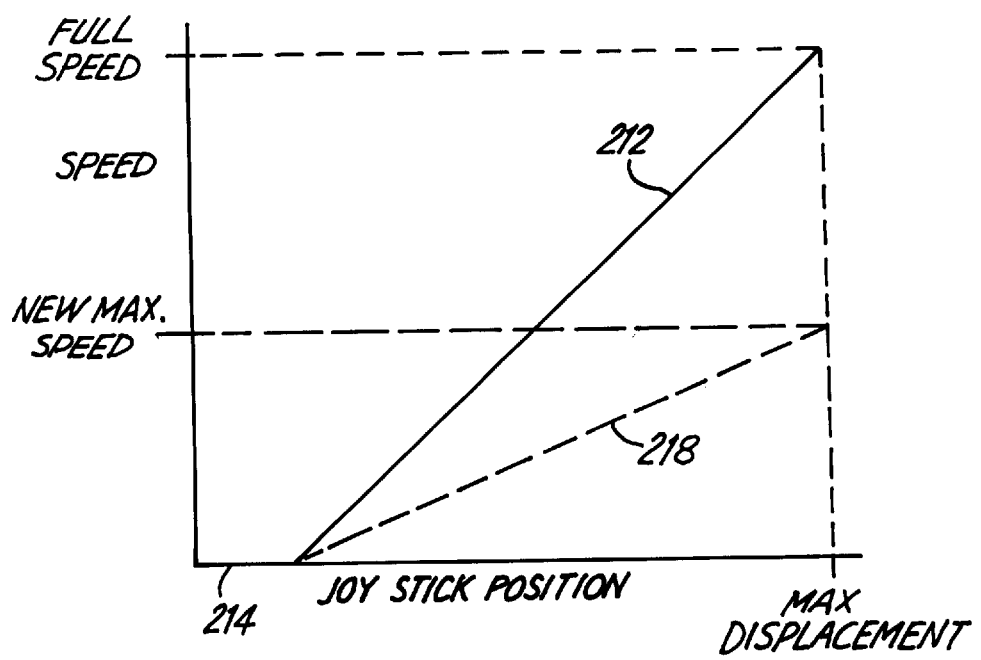
FIG. 5 is a graph of speed versus joystick displacement.

In addition, actuators 114 illustratively include a plurality of settable operating parameters. Controller 116 illustratively controls wheel speed based on joystick position according to a curve such as that shown at 212 in FIG. 5. An initial portion 214 of curve 212 illustrates a deadband portion. The deadband portion is a range of movement of joysticks 102 and 104 around the central, neutral position which will result in no control outputs from controller 116. Once outside the deadband, additional movement of the joystick results in an increased speed output from controller 116.

Figure 6:
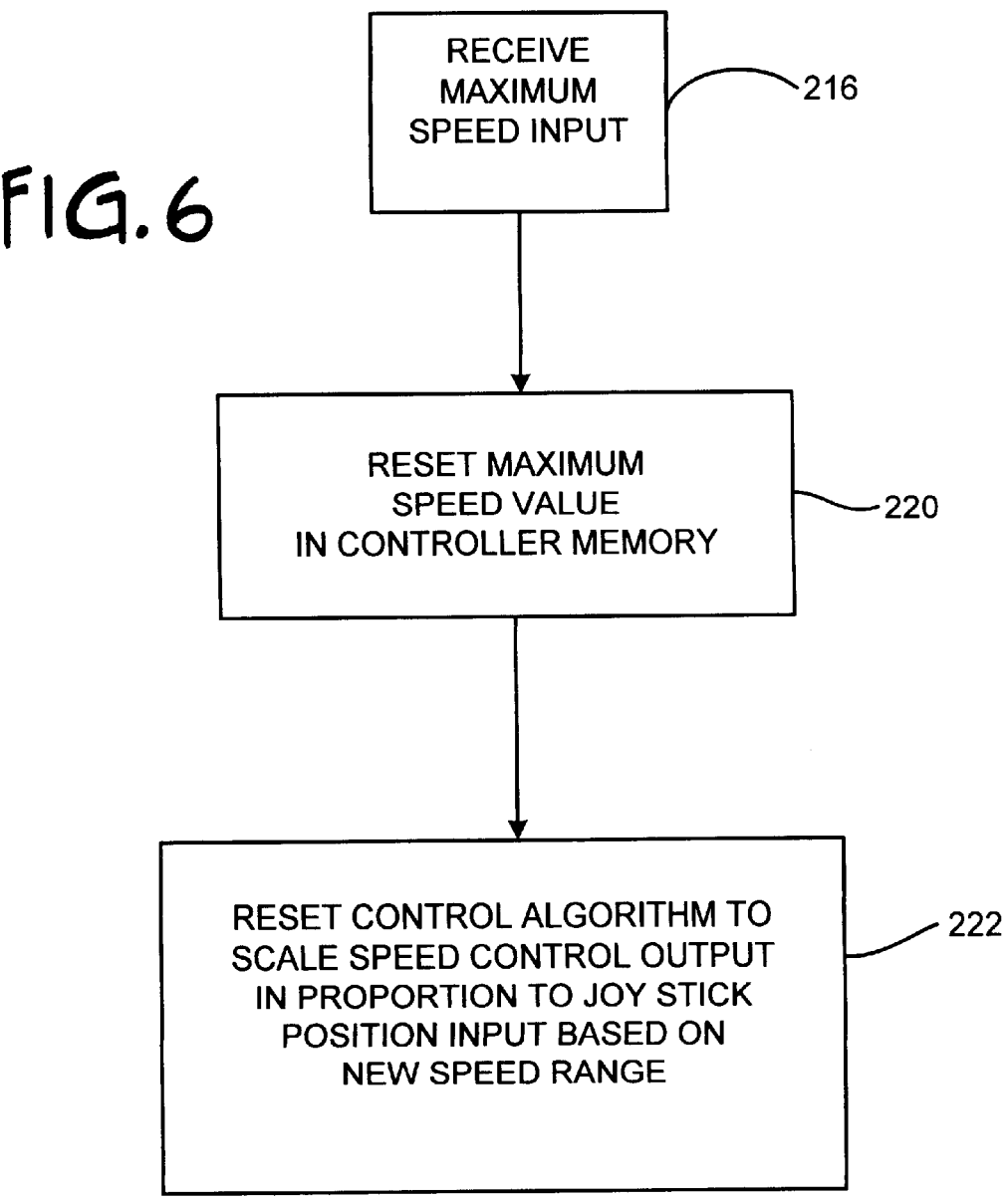
FIG. 6 is a flow diagram of maximum speed setting.

The settable parameters can include, for example, the maximum speed of the power machine. In other words, when joysticks 102 and 104 are placed in the position, by the user, of maximum displacement to reflect maximum forward or reverse speed, that speed can illustratively be set by the user, or other personnel, prior to use, as indicated by block 216 in FIG. 6. Actuator input 162 for setting maximum speed can simply be a high/low actuator which causes the power machine to operate in a high speed or low speed fashion, or it can be a continuous actuator which causes the maximum speed to vary linearly from a higher speed to a lower speed. Once a new maximum speed value is received, it is reset in controller memory. Controller 116 then adjusts the control algorithm to control according to a new curve 218. This is indicated by blocks 220 and 222 in FIG. 6.

Figure 7:
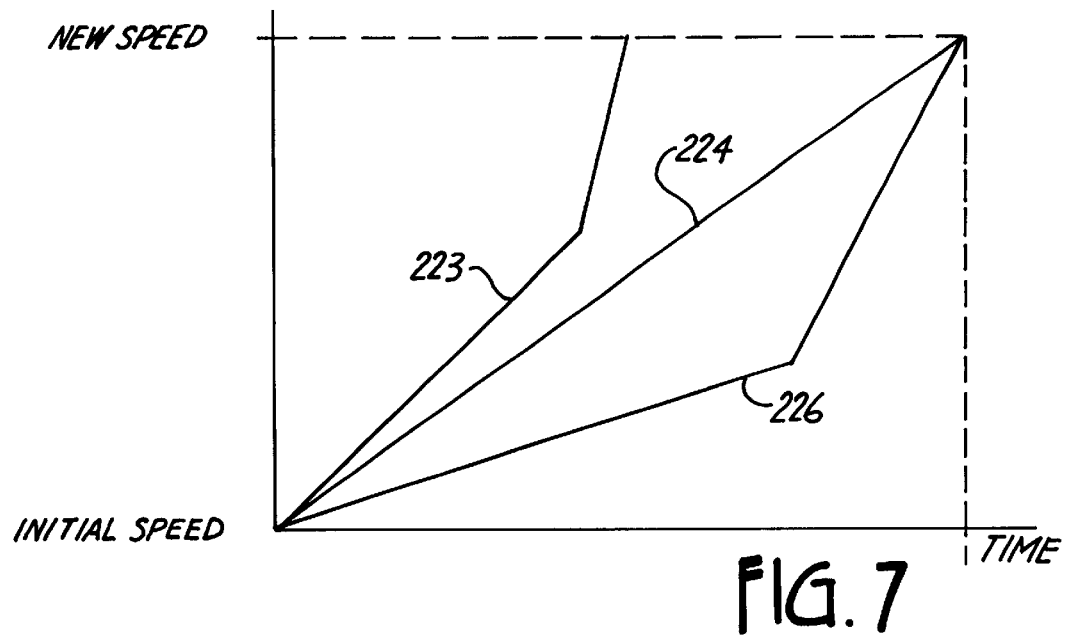
FIG. 7 is a graph of speed versus time given a step input to the joystick.

In addition, the rate at which the loader accelerates based on a user input from the joystick can be varied by selecting predefined acceleration curves with a digital switch or by adjusting the curve using a variable input. For example, FIG. 7 illustrates three different acceleration curves 223, 224 and 226. A switch may be used to switch between two or more such predefined curves. Alternatively, a variable input may be implemented to allow the user to adjust the acceleration curve from a default setting. In accordance with one embodiment, controller 116 controls the traction motor to accelerate in a linear manner from an initial speed to a new speed (e.g., along curve 224). However, this response can be changed. For example, it may be desirable to accelerate more slowly at first and then more quickly, as indicated by curve 226, or vice versa. Of course, non-linear responses, stepped responses or other response curves can be implemented as well.

This same type of setting can be provided for steering features. For instance, the maximum turning radius of the power machine can be set. In that embodiment, when the user operates the joysticks 102 and 104 to accomplish a tight right or left turn, the maximum degree of turning of the wheels can be set by the operator.

Figure 8:
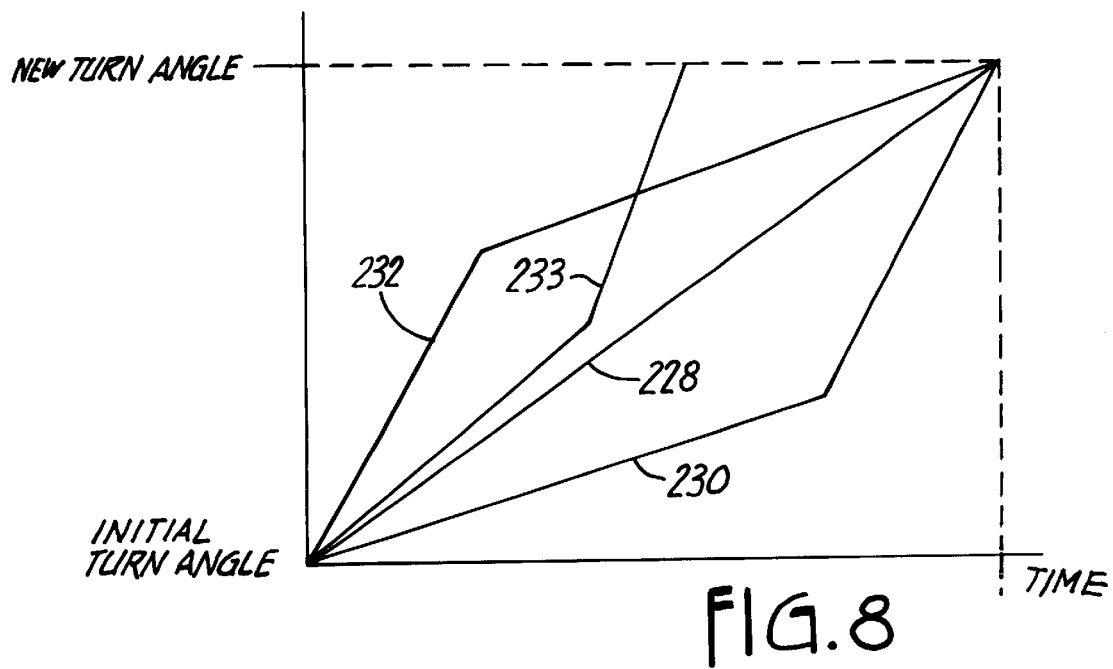
FIG. 8 is a graph of turn angle versus time given a step input to the joystick.

Further, as with the acceleration response, the steering response can be varied as well. For example, FIG. 8 shows steering angle plotted against time assuming a step input at the joystick (e.g., the user has displaced the joystick from neutral to one side in a quick continuous movement). Controller 116 can change the steer angle from the initial angle (e.g., zero degrees—straight ahead) to a new steer angel (e.g., the maximum steer angle) in a linear fashion as shown by curve 228. However, that control curve can be changed to turn more slowly at first, and then more quickly as shown by curve 230, or vice versa, as shown by curve 232 or even more dramatically as shown by curve 233. Of course, other control curves could be used as well, such as non-linear response curves, or stepped response curves. Further, the change can be made between two predetermined curves (e.g., using a switch) or can be made by continuously varying the response (e.g, using a slide, paddle or other continuous input) from a default or other predetermined response curve. Therefore, the rate at which the power machine turns in response to a user input can be varied between high and low response modes (in which the high response mode is a more quick response than the low response mode) or it can be varied continuously between the high and low response modes.

Figure 9:
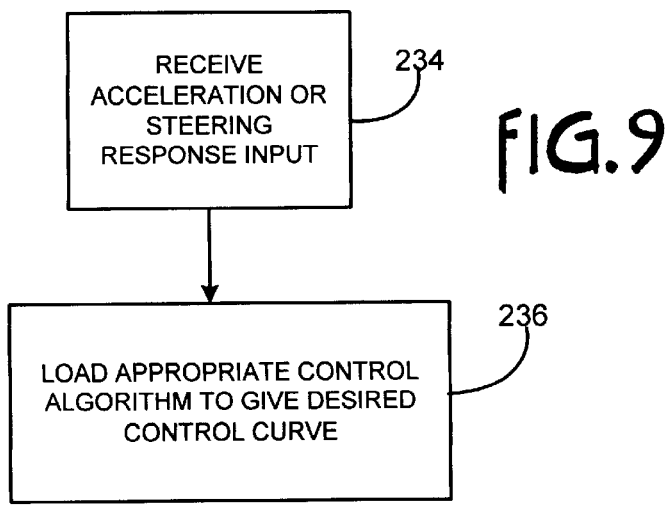
FIGS. 9–11 are flow diagrams illustrating setting the acceleration of steering response, setting the deadband, and setting a maximum steering speed.

FIG. 9 is a simplified flow diagram illustrating changing of acceleration and steering response. First, controller 116 receives an input to change the acceleration or steering response from inputs 158 or 160 (in FIG. 2). This is indicated by block 234 in FIG. 9. Controller 116 then loads the appropriate constants or algorithm to obtain the desired control curve. This is indicated by block 236.

Figure 10:
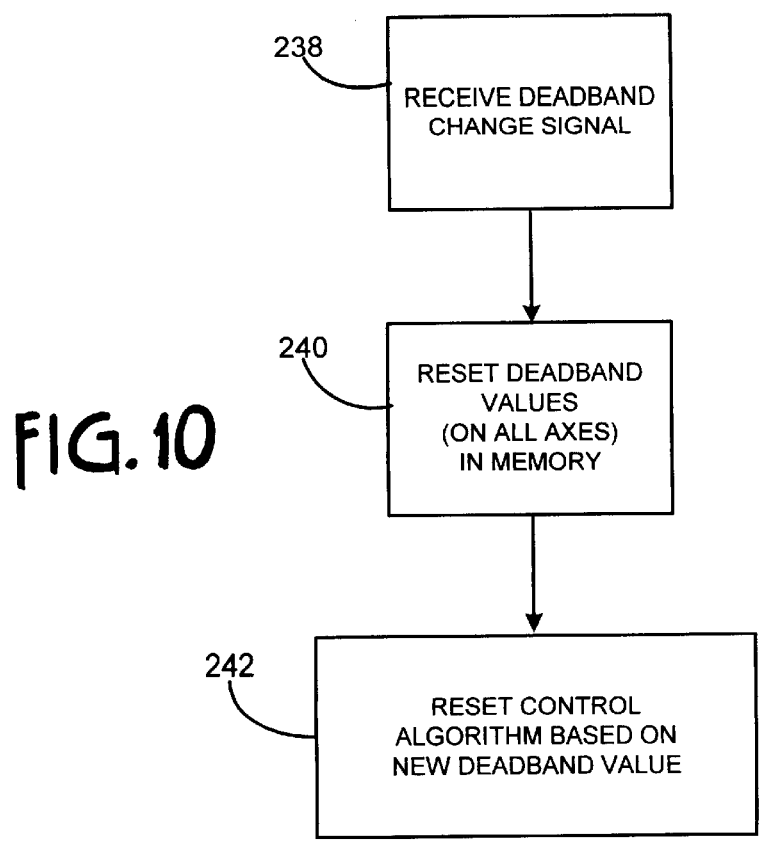

Actuators 114 can also include a deadband input 164. The deadband (214 in FIG. 5) corresponds to the amount of displacement from neutral which joysticks 102 and 104 can undergo without incurring a resultant response from controller 116. Illustratively, joysticks 102 and 104 have a deadband around their centered, neutral position such that the user can move the joystick slightly, without incurring a controller-based steering or acceleration response. The size of the deadband can be set in a similar fashion to the other settable parameters discussed above. FIG. 10 is a flow diagram better illustrating this. In FIG. 10, controller 116 first receives a deadband change signal from input actuator 164. This is indicated by block 238. Controller 116 then resets the deadband values, on all axes, in controller memory. This is indicated by block 240. Finally, controller 116 adjusts the control algorithm (such as moving the starting point of curve 212 in FIG. 5) to accommodate the new deadband values. This is indicated by block 242.

Figure 11:
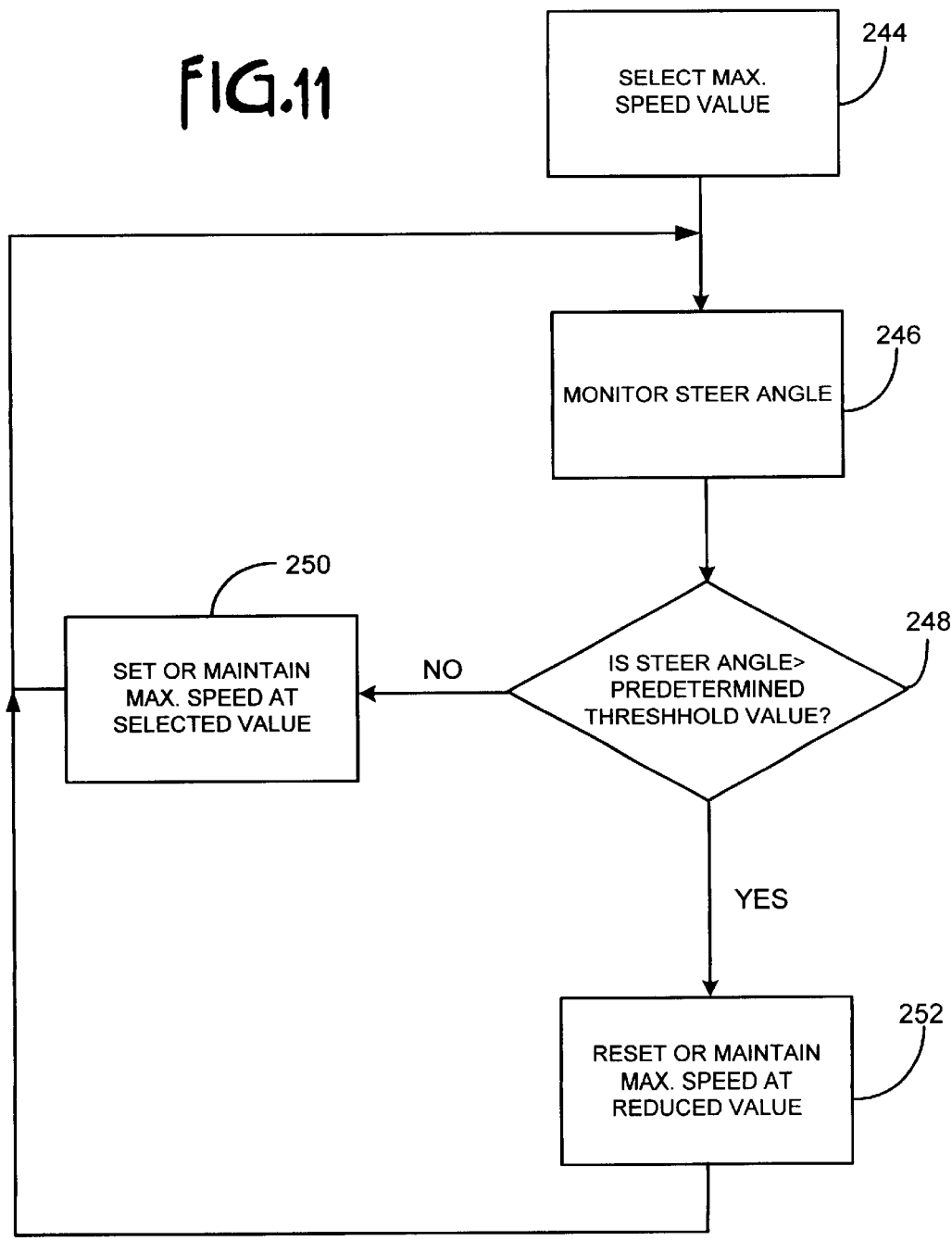

It may also be desirable to change a maximum speed allowed during cornering. Therefore, actuators 114 can also include a steering maximum speed input 166. For instance, during sharp turns, the maximum loader speed allowed may be a slower speed than the maximum speed during straight ahead travel or during shallow turns. It may be desirable to be able to set the maximum steering speed as well. FIG. 11 better illustrates how this can be implemented. First, a normal maximum speed value and a steering maximum speed value are selected using inputs 162 and 166. This is indicated by block 244. Controller 116 then monitors the steering angle to see whether it exceeds a predetermined threshold value based on feedback from steering angle sensors 119. This is indicated by block 246 and 248. If not, the maximum speed is set to the normal maximum speed as indicated by block 250. If so, however, this means that loader 10 is steering at a sharp enough angle to invoke the steering maximum speed setting. Controller 116 then retrieves this value and resets the maximum allowed speed in the control algorithm, as indicated by block 252. Once the steering angle is less than a predetermined threshold value, the maximum speed allowed is again set to its normal value.

Figure 12:
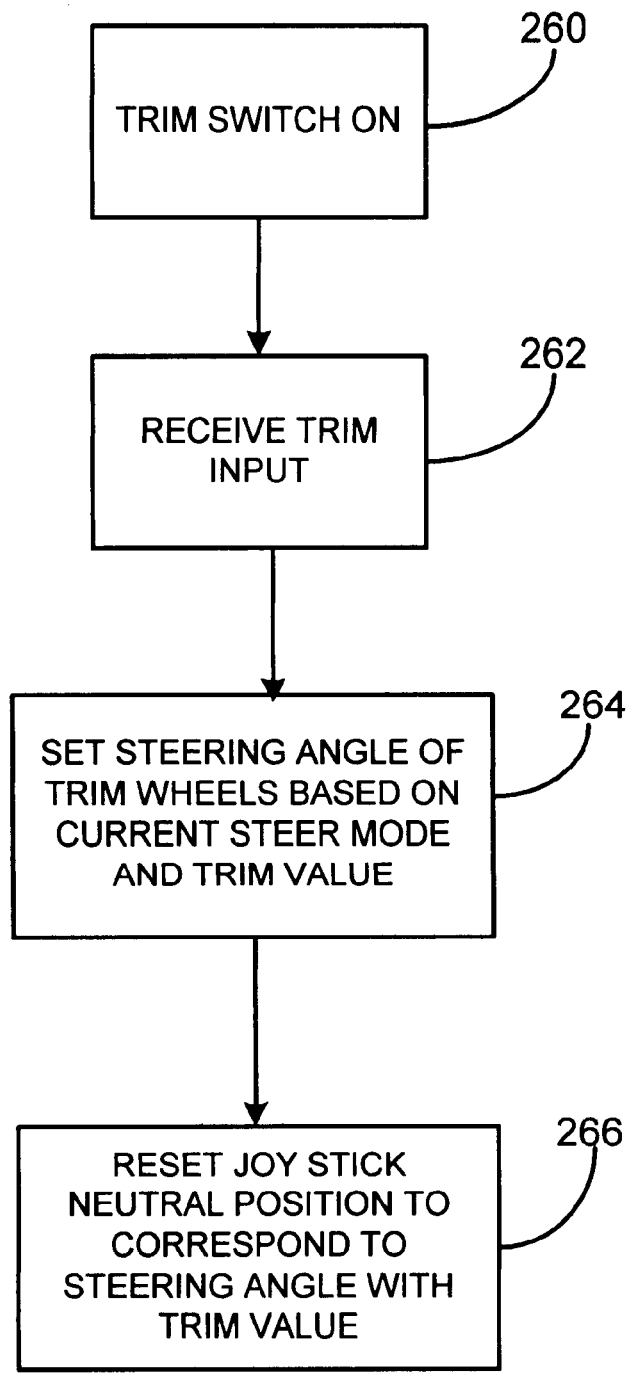
FIGS. 12 and 13 illustrate implementation of a trim function.
Figure 13:
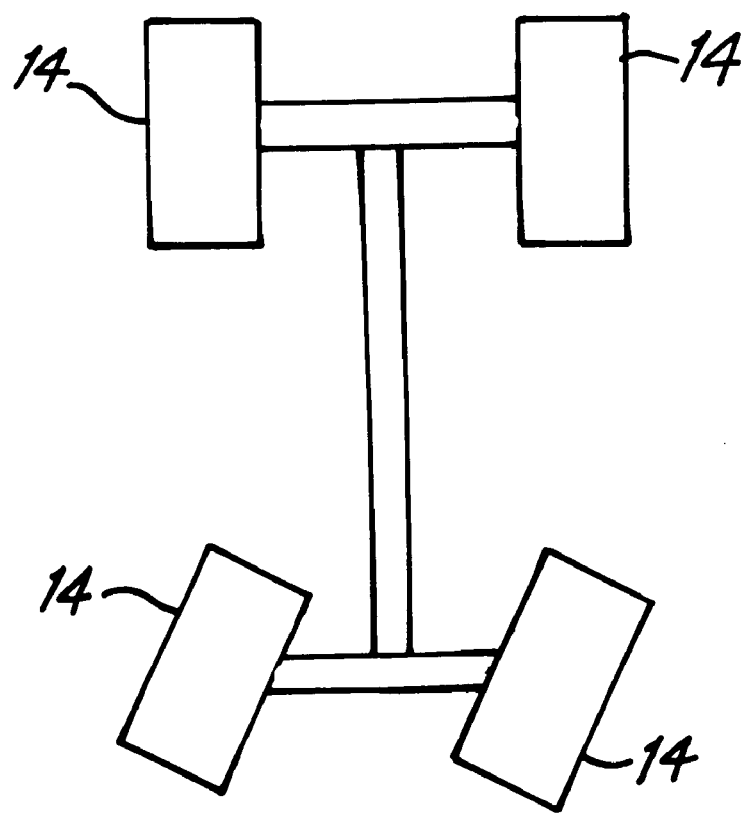

In another illustrative embodiment, actuators 114 also include trim actuators 150 and 152 (as described with respect to FIGS. 12 and 13). In other words, when loader 10 is traveling across the face of a slope, one or more of the wheels can be trimmed in the up hill direction (such as shown in FIG. 13), to offset the weight of the machine and gravity which tends to pull the machine down hill. In one such embodiment, the trim actuators include a trim on/off button 150 which simply turns on or off the trim function, and a trim right/left button 152 which causes the wheels, when the trim function is enabled, to be turned a predetermined number of degrees to the right or left relative to the longitudinal axis of the vehicle. The switch being turned on and the trim valve being set is illustrated by blocks 260 and 262. Setting the steering angle based on these inputs is shown in block 264. Of course, the trim right/left actuator 152 could also be a rotary actuator, a linear slide-type actuator or another type of actuator, such that the degree of trim can be continuously adjusted. When in the front wheel steer or rear wheel steer modes, only the non-steering wheels will illustratively be trimmed. Of course, the steering wheels could be adjusted as well. In either case, the trim offset will then correspond to the neutral position of the joystick, as indicated by block 266.

Based upon these inputs, controller 116 provides an output to drive pump valves 126 and steering valves 120. In one illustrative embodiment, drive motors 128 and steering cylinders 122 are hydraulically actuated devices. Therefore, steering valves 120 and drive pump valves 126 control the flow of hydraulic fluid under pressure to steering cylinders 122 and drive motors 128, respectively. In order to increase the speed of movement of the loader, drive pump valves 126 are positioned to provide increased flow of hydraulic fluid to drive motors 128 which are, in turn, coupled to wheels 124 through an axle. Similarly, in order to increase or decrease the amount that the wheels are steered relative to the longitudinal axis of the loader, valves 120 are positioned to provide hydraulic fluid under pressure to steering cylinders 122 to either lengthen those cylinders or shorten them. This, of course, causes the wheels to pivot about the axles to which they are mounted, to change the degree of steering associated with those wheels.

Figure 14A:
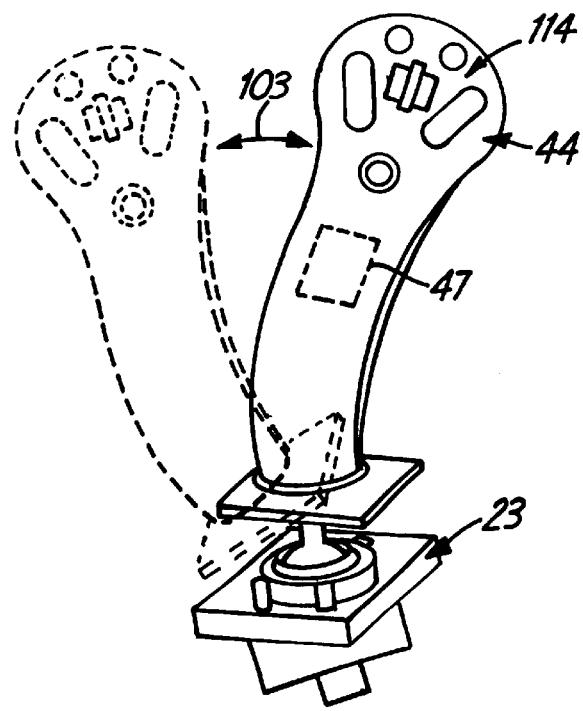
FIGS. 14A and 14B are views of one embodiment of a joystick used as a user input mechanism.
Figure 14B:
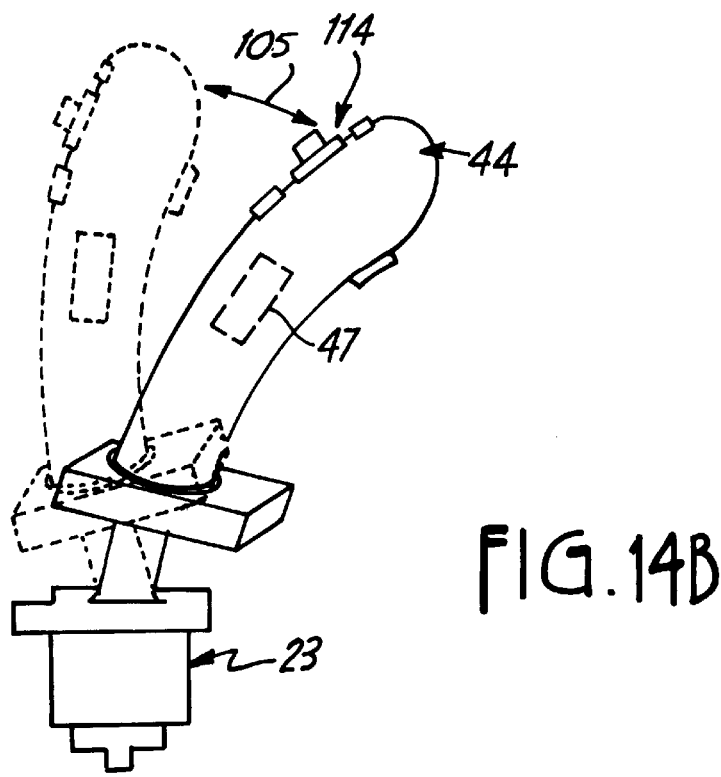

FIGS. 14A and 14B illustrate one embodiment of a handgrip 44 which is supported by one of joysticks 102 or 104. Of course, both joysticks can include similar or different handgrips. Also, while the present invention can be used with substantially any type of grip on joysticks 102 and 104, those illustrated in FIGS. 14A–14B are provided for exemplary purposes only.

In FIG. 14A, handgrip 44 is viewed from the rear (or operator) side, illustrating buttons 114. FIG. 14B is illustrated from the operator's right hand side. Both FIGS. 14A and 14B illustrate phantom figures which show handgrip 44 pivoted from its neutral position. In FIG. 14A, handgrip 44 is pivoted to the operator's left hand side (as shown in phantom) in the direction indicated by arrow 103. Of course, it will be noted that handgrip 44 can be pivoted to the user's right hand side as well. FIG. 14B shows hand grip 44 pivoted in the aft direction (toward the user as shown by arrow 105) as also shown in phantom. Of course, handgrip 44 can also be pivoted in the forward direction.

In one illustrative embodiment, the range of motion (from the solid image to the phantom image shown in both FIGS. 14A and 14B) is approximately 4.25 inches, and is offset by an angle of approximately 20 degrees. It should also be noted that, in one embodiment, joystick assembly 23 (other than the handgrips) is a commercially available joystick assembly produced and available from the Sauer Company.

FIGS. 14A and 14B also schematically illustrate controller 47 which is embedded within handgrip 44. In one illustrative embodiment, controller 47 is contained in a module with associated memory, that is embedded within the interior of hand grip 44 while a flex circuit couples buttons 114 to controller 47. In one embodiment, the exterior of hand grip 44 is hard or soft plastic or rubber, or a hard material with a friction increasing surface (such as texture or a softer gripping material) disposed where the user's hand engages the hand grip 44, such as under the palm region, the finger region and/or the finger tip region. The controller 47 (and possibly an associated circuit board) is illustratively, securely attached within an inner cavity of handgrip 44 through adhesive, screws, clamps or another mechanical attachment mechanism. In one illustrative embodiment, a three conductor serial communication link is provided between controller 47 and controller 116. The three conductors include power, ground, and a serial communication conductor. In another embodiment, controller 47 includes a wireless transmitter while controller 116 includes a wireless receiver. Wireless communication is then effected between the two using radiation, such as radio signals, infrared signals or other electromagnetic radiation.

Although the present invention has been described with reference to preferred embodiments, workers skilled in the art will recognize that changes may be made in form and detail without departing from the spirit and scope of the invention.

What is claimed is:

1. A control system for a power machine having independently steerable and rotatable wheels, the control system comprising:

a user input device including a plurality of user actuable inputs providing user actuation signals; and an electronic controller coupled to the user input device and configured to receive a plurality of user selectable operating parameters, based on user actuation of the user actuable inputs, and provide a steering control signal to control steering of the wheels and a speed control signal to control speed of the wheels based on the operating parameters received.

2. The control system of claim 1 wherein the power machine is steerable in a plurality of different steering modes and wherein the user actuable inputs include:

a drive mode select input providing a selection signal indicative of a selected one of the plurality of steering modes, the controller being configured to provide the steering control signal based on the selection signal received.

3. The control system of claim 1 wherein the user input device comprises:

at least one joystick movable relative to a neutral position.

4. The control system of claim 3 wherein the user actuable inputs include:

a dead band input providing a dead band signal indicative of a desired range of movement of the joystick relative to the neutral position through which the joystick is to move before invoking a controller responsive output.

5. The control system of claim 1 wherein the controller provides the control signals to accelerate the wheels according to an acceleration control parameter and wherein the user actuable inputs comprise:

a drive acceleration input providing an acceleration signal indicative of a desired acceleration control response; and wherein the controller is configured to modify the acceleration control parameter based on the acceleration signal.

6. The control system of claim 5 wherein the acceleration control parameter comprises an acceleration control curve.

7. The control system of claim 1 wherein the controller controls a speed at which the wheels are steered based on a steering control parameter and wherein the user actuable inputs comprise:

a steering control input providing a steering control signal indicative of a desired steering control response; and wherein the controller is configured to modify the steering control parameter based on the steering control signal.

8. The control system of claim 7 and further comprising:

a steering angle sensor coupled to the controller and providing a steer angle signal indicative of an angle at which an associated wheel is disposed relative to a predetermined wheel angle.

9. The control system of claim 8 wherein the controller controls wheel speed based, at least in part, on a maximum speed value indicative of a maximum drive speed, and wherein the user actuable inputs comprise:

a steering maximum speed input providing a maximum steering speed signal indicative of a maximum speed when the steer angle signal indicates that the wheels exceed a predetermined steer angle threshold value.

10. The control system of claim 9 wherein the controller is configured to adjust the maximum drive speed to the maximum speed indicated by the maximum steering speed signal when the steer angle signal indicates that the wheels exceed the predetermined steer angle threshold.

11. The control system of claim 1 and further comprising:

a wheel speed sensor coupled to the controller and providing a speed signal indicative of wheel speed.

12. The control system of claim 1 and further comprising:

a user actuable momentary steering mode input, coupled to the controller, providing a momentary steering mode signal indicative of a desired momentary steering mode; and wherein the controller is configured to receive momentary steering mode signal and provide the steering control signal to control the power machine in the momentary steering mode until the momentary steering mode signal is de-actuated.

13. The control system of claim 12 wherein the controller is further configured to provide the steering control signal to control the power machine in a previously selected steering mode when the momentary steering mode signal is de-actuated.

14. The control system of claim 13 wherein the momentary steering mode comprises a skid steer mode and wherein the controller is configured to provide the steering control signal to move all the wheels to a straight ahead direction prior to controlling the power machine in the skid steer mode.

15. The control system of claim 1 and further comprising:

a user actuable trim input, coupled to the controller, providing a trim input signal, the controller being configured to receive the trim input signal and provide the steering control signal to trim at least one of the wheels by steering it to a positive or negative angle relative to a straight ahead direction.

16. The control system of claim 15 wherein the trim input includes:

a trim on/off switch providing an enable signal to enable and disable the trim; and a trim select switch providing a trim value indicative of a degree of steering angle by which to trim the wheels.

17. The control system of claim 15 wherein the controller is configured to trim a predetermined set of the plurality of wheels based on a currently selected steering mode and the trim input signal.

18. A control system for a power machine having independently steerable and rotatable wheels, steerable in a plurality of different modes, the control system comprising:

a user input device including a plurality of user actuable inputs providing user actuation signals including a drive mode select input providing a selection signal indicative of a selected one of the plurality of steering modes;

an electronic controller coupled to the user input device and configured to receive a plurality of user selectable operating parameters, based on user actuation of the user actuable inputs, and provide a steering control signal to control steering of the wheels and a speed control signal to control speed of the wheels based on the operating parameters received; and a user actuable momentary steering mode input, coupled to the controller, providing a momentary steering mode signal indicative of a desired momentary steering mode; and wherein the controller is configured to receive the momentary steering mode signal and provide the steering control signal to control the power machine in the momentary steering mode until the momentary steering mode signal is de-actuated.

19. The control system of claim 18 wherein the controller is further configured to provide the steering control signal to control the power machine in a previously selected steering mode when the momentary steering mode signal is de-actuated.

20. The control system of claim 19 wherein the momentary steering mode comprises a skid steer mode and wherein the controller is configured to provide the steering control signal to move all the wheels to a straight ahead direction prior to controlling the power machine in the skid steer mode.

21. A control system for a power machine having independently steerable and rotatable wheels, steerable in a plurality of different modes, the control system comprising;

a user input device including a plurality of user actuable inputs providing user actuation signals including a drive mode select input providing a selection signal indicative of a selected one of the plurality of steering modes;

an electronic controller coupled to the user input device and configured to receive a plurality of user selectable operating parameters, based on user actuation of the user actuable inputs, and provide a steering control signal to control steering of the wheels and a speed control signal to control speed of the wheels based on the operating parameters received; and a user actuable trim input, coupled to the controller, providing a trim input signal, the controller being configured to receive the trim input signal and provide the steering control signal to trim at least one of the wheels by steering it to a trim position comprising a positive or negative angle relative to a straight ahead direction and to maintain the at least one wheel in the trim position during subsequent steering of the wheels.

22. The control system of claim 21 wherein the trim input includes:

a trim on/off switch providing an enable signal to enable and disable the trim; and a trim select switch providing a trim value indicative of a degree of steering angle by which to trim the wheels.

23. The control system of claim 21 wherein the at least one wheel comprises a predetermined set of the plurality of wheels, trimmed by the controller based on a currently selected steering mode and the trim input signal.

24. The control system of claim 1 wherein the power machine is operable in a plurality of different speed modes and wherein the user actuable inputs include:

a maximum speed mode select input providing a selection signal indicative of a selective one of the plurality of maximum speed modes, the controller being configured to provide the speed control signal based on the selection signal received.

25. The user actuable input of claim 24 wherein the maximum speed mode select input is a selection device configured to selectively switch between one maximum speed mode and at least one other of the plurality of maximum speed modes.

26. The user actuable input of claim 25 wherein the selection device comprises a plurality of push buttons;

each of the plurality of push buttons being configured to select one of the plurality of speed modes.

27. The user actuable input of claim 25 wherein the selection device comprises a push button to select between two different maximum speed modes.

28. The user actuable input of claim 25 wherein the selection device selects between two different maximum speed modes.

29. The user actuable input of claim 25 wherein the selection device is a continuous actuator to vary maximum speed linearly from a higher speed to a lower speed.

30. The control system of claim 1 wherein the power machine is operable in a plurality of different acceleration modes and wherein the user actuable inputs include:

an acceleration mode select input providing a selection signal indicative of a selected one of the plurality of acceleration modes, the controller being configured to provide an acceleration control signal based on the selection signal received.

31. The user actuable input of claim 30 wherein the acceleration mode select input is a selection device for selectively switching between one acceleration mode and at least one other of the plurality of acceleration modes.

32. The user actuable input of claim 31 wherein the selection device is a plurality of push buttons;

each of the plurality of push buttons being configured to select one of the plurality of acceleration modes.

33. The user actuable inputs of claim 31 wherein the selection device is a push button to select between one of two acceleration control modes.

* * * * *

UNITED STATES PATENT AND TRADEMARK OFFICE
CERTIFICATE OF CORRECTION

PATENT NO.     : 6,863,144 B2
DATED          : March 8, 2005
INVENTOR(S)    : Kenneth A. Brandt et al.

It is certified that error appears in the above-identified patent and that said Letters Patent is hereby corrected as shown below:

Title page,
Item [75], Inventors, delete "Eagan, ND (US);" and insert -- Eagan, MN (US); --
Item [56], References Cited, U.S. PATENT DOCUMENTS,
delete "3,620,321 A    11/1971    Thilobodeau    180/46" and insert -- 3,620,321 A    11/1971    Thibodeau    180/46 --

Column 1,
Line 5, delete "is a continuation-in-part" and insert -- claims priority of --.
Line 7, after "6,550,562" insert -- , --.

Column 11,
Line 26, delete ";" and insert -- : --.

Signed and Sealed this

Twenty-first Day of June, 2005

JON W. DUDAS
*Director of the United States Patent and Trademark Office*